United States Patent
Kuroda et al.

(10) Patent No.: US 11,485,345 B2
(45) Date of Patent: Nov. 1, 2022

(54) VEHICLE CONTROL APPARATUS

(71) Applicant: SUBARU CORPORATION, Tokyo (JP)

(72) Inventors: Kyousuke Kuroda, Tokyo (JP); Mitsuo Aoki, Tokyo (JP); Yoshitsugu Inoue, Tokyo (JP); Shinya Sagawa, Tokyo (JP); Tomoyuki Yamamuro, Tokyo (JP); Akihito Katsume, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 603 days.

(21) Appl. No.: 16/450,224

(22) Filed: Jun. 24, 2019

(65) Prior Publication Data
US 2020/0086846 A1  Mar. 19, 2020

(30) Foreign Application Priority Data

Sep. 18, 2018  (JP) .............................. JP2018-173319

(51) Int. Cl.
*B60W 10/06* (2006.01)
*B60G 17/0195* (2006.01)
(Continued)

(52) U.S. Cl.
CPC ......... *B60W 10/06* (2013.01); *B60G 17/0195* (2013.01); *B60W 10/02* (2013.01);
(Continued)

(58) Field of Classification Search
CPC ...... B60W 10/06; B60W 10/02; B60W 10/08; B60W 2030/1809; B60W 2050/0026;
(Continued)

(56) References Cited

U.S. PATENT DOCUMENTS

2012/0220422 A1* 8/2012 Wurthner ........ B60W 30/18072
  477/79
2014/0067225 A1* 3/2014 Lee ..................... B60W 30/188
  701/93
(Continued)

FOREIGN PATENT DOCUMENTS

JP  06-219348 A  8/1994
JP  2004-211575 A  7/2004
(Continued)

OTHER PUBLICATIONS

Japanese Notification of Reasons for Refusal issued in corresponding Japanese Patent Application No. 2018-173319, dated Nov. 8, 2019, with English translation.
(Continued)

*Primary Examiner* — Frederick M Brushaber
(74) *Attorney, Agent, or Firm* — McDermott Will & Emery LLP

(57) ABSTRACT

A vehicle control apparatus, configured to control a vehicle, includes an engine that is configured to drive wheels via a power transmission device. The vehicle control apparatus includes a towing state detector and an engine controller. The towing state detector is configured to detect whether the vehicle is in a towing state. The engine controller is configured to stop the engine in a case where a predetermined engine stopping condition is satisfied during traveling of the vehicle. The engine controller is configured to vary, in a case where the towing state detector detects that the vehicle is in the towing state, the predetermined engine stopping condition to reduce an operational range in which the engine is to be stopped compared with an operational range in a case where the towing state detector does not detect that the vehicle is in the towing state.

6 Claims, 3 Drawing Sheets

(51) Int. Cl.
  *B60W 10/02* (2006.01)
  *B60W 10/08* (2006.01)
  *B60W 30/18* (2012.01)
  *B60W 40/105* (2012.01)
  *B60W 50/00* (2006.01)

(52) U.S. Cl.
  CPC ...... *B60W 10/08* (2013.01); *B60W 30/18072* (2013.01); *B60W 40/105* (2013.01); *B60W 2030/18081* (2013.01); *B60Y 2200/147* (2013.01); *B60Y 2300/188* (2013.01); *B60Y 2300/28* (2013.01)

(58) Field of Classification Search
  CPC ....... B60W 2510/182; B60W 2540/10; B60W 2540/18; B60W 2554/802; B60W 30/18072; B60W 40/105; B60W 2030/18081; B60W 2520/10; B60W 2520/105; B60W 2530/203; B60W 2710/021; B60W 2710/06; B60W 2710/10; B60W 30/18; B60W 10/10; B60W 2300/12; B60G 17/0195; B60Y 2200/147; B60Y 2300/188; B60Y 2300/28
  See application file for complete search history.

(56) References Cited

U.S. PATENT DOCUMENTS

| | | | |
|---|---|---|---|
| 2016/0176403 A1* | 6/2016 | Weston | B60W 30/162 |
| | | | 701/96 |
| 2017/0001640 A1 | 1/2017 | Asakura et al. | |
| 2017/0254411 A1 | 9/2017 | Harada | |
| 2018/0093650 A1* | 4/2018 | Payne | B60T 8/172 |
| 2018/0202408 A1 | 7/2018 | Majima | |

FOREIGN PATENT DOCUMENTS

| | | | |
|---|---|---|---|
| JP | 2012-092671 A | | 5/2012 |
| JP | 2017-155825 A | | 9/2017 |
| JP | 2018-071465 A | | 5/2018 |
| JP | 2018-105251 A | | 7/2018 |
| JP | 2018-112155 A | | 7/2018 |
| WO | 2014/168016 A1 | | 10/2014 |
| WO | 2015/118570 A1 | | 8/2015 |

OTHER PUBLICATIONS

Japanese Notification of Reasons for Refusal issued in corresponding Japanese Patent Application No. 2018-173319, dated Mar. 2, 2020, with English translation.

* cited by examiner

VEHICLE CONTROL APPARATUS

CROSS-REFERENCE TO RELATED APPLICATIONS

The present application claims priority from Japanese Patent Application No. 2018-173319 filed on Sep. 18, 2018, the entire contents of which are hereby incorporated by reference.

BACKGROUND

The technology relates to a vehicle control apparatus configured to control a vehicle that is allowed to stop an engine during traveling of the vehicle.

A vehicle such as an automobile may tow any of various kinds of trailers (towed vehicles) such as a trailer used to load burdens or a trailer house, for example.

Further, it has been proposed that a control, for example, of driving of a vehicle at the time when the vehicle tows something is varied with respect to a control during usual driving of the vehicle.

Reference can be made, for example, to the following patent documents as an existing technique regarding a control during towing of a vehicle. Japanese Unexamined Patent Application Publication No. 2017-155825 discloses an automatic transmission apparatus that includes an engaging clutch element and a releasing clutch element. In this automatic transmission apparatus, in a case where a towing state determining unit determines that a vehicle is in a towing state, at least one of an engaging hydraulic pressure or a releasing hydraulic pressure immediately before rotational variation of an input shaft occurs is increased on the basis of an increase in a traveling load.

Further, Japanese Unexamined Patent Application Publication No. H06-219348 discloses a system in which a vehicle that performs towing is controlled. In this system, when a vehicle to be towed is coupled to the vehicle, outputs of an engine and an automatic transmission are to be increased, and control gain of each of an antilock brake system (ABS) control, an active suspension (ACS) control, and a four-wheel steering (4WS) control is corrected to a value adapted for a towing state.

SUMMARY

An aspect of the technology provides a vehicle control apparatus configured to control a vehicle. The vehicle includes an engine that is configured to drive wheels via a power transmission device. The vehicle control apparatus includes a towing state detector and an engine controller. The towing state detector is configured to detect whether the vehicle is in a towing state. The engine controller is configured to stop the engine in a case where a predetermined engine stopping condition is satisfied during traveling of the vehicle. The engine controller is configured to vary, in a case where the towing state detector detects that the vehicle is in the towing state, the predetermined engine stopping condition to reduce an operational range in which the engine is to be stopped compared with an operational range in a case where the towing state detector does not detect that the vehicle is in the towing state.

An aspect of the technology provides a vehicle control apparatus configured to control a vehicle. The vehicle includes an engine that is configured to drive wheels via a power transmission device. The vehicle control apparatus includes circuitry. The circuitry is configured to control the engine. The circuitry is configured to detect whether the vehicle is in a towing state. The circuitry is configured to stop the engine in a case where a predetermined engine stopping condition is satisfied during traveling of the vehicle. The circuitry is configured to vary, in a case where the vehicle is detected as being in the towing state, the predetermined engine stopping condition to reduce an operational range in which the engine is to be stopped compared with an operational range in a case where the vehicle is not detected as being in the towing state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
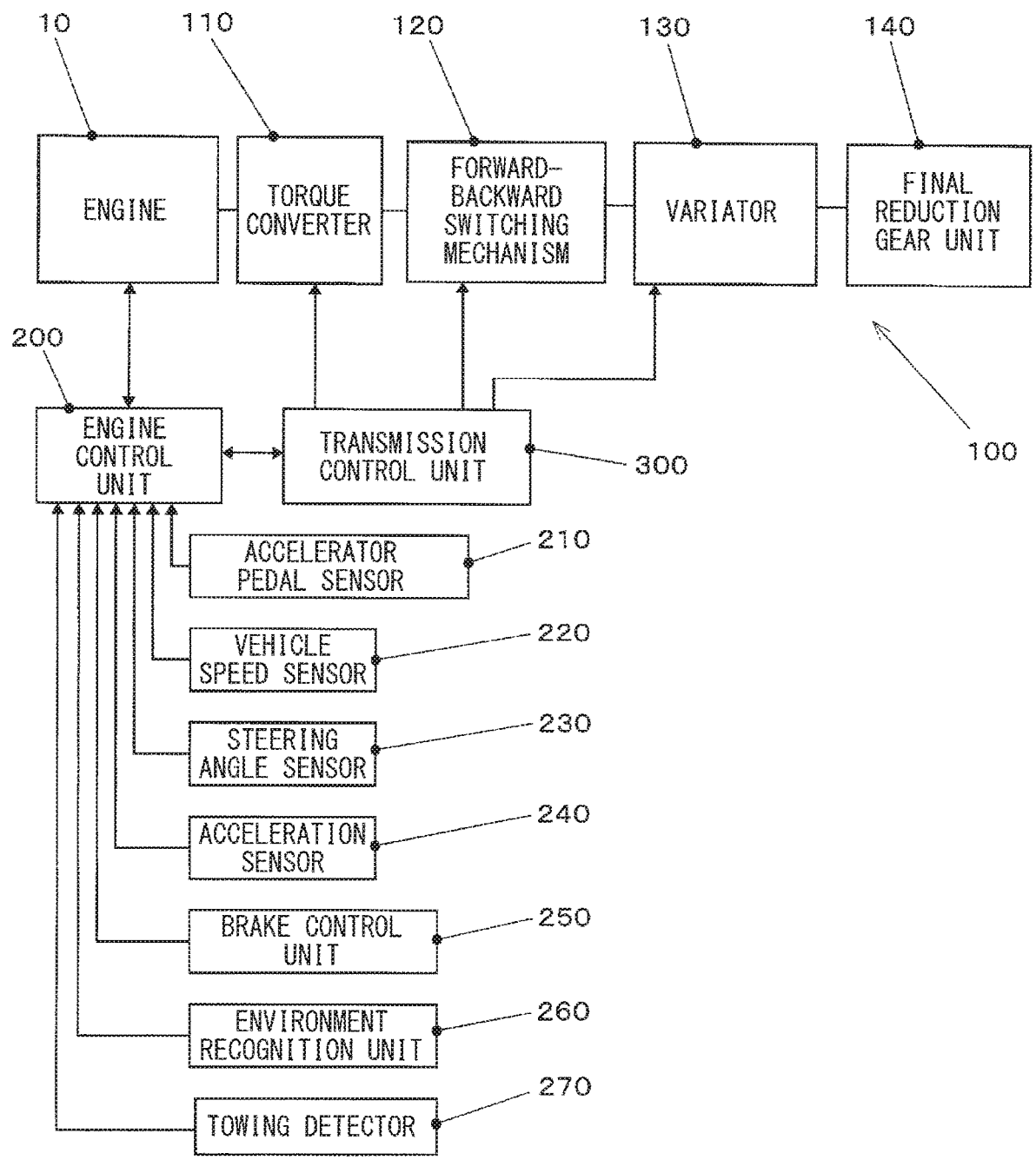
FIG. 1 is a block diagram schematically illustrating an example of a configuration of a vehicle on which a vehicle control apparatus according to an example embodiment of the technology is mounted.

A vehicle control apparatus according to an example embodiment of the technology will be described below. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

In order to improve fuel consumption of a vehicle, in recent years, a technique has been proposed that the vehicle is caused to execute inertia traveling (or coast) by stopping an engine during traveling of the vehicle in a case where a predetermined condition is satisfied.

In a case where the engine is stopped during the traveling of the vehicle to cause the vehicle to execute the inertia traveling, performance of a brake booster using a manifold vacuum pressure of the engine is lowered, and this causes braking force to be lowered. In addition, the vehicle is in a state where driving force is not applied to wheels. Therefore, driving stability while avoiding risk may vary with respect to that of a usual operation of the engine. Therefore, for example, in a case where an inter-vehicle distance from the vehicle to another proceeding vehicle is short, the vehicle may be controlled not to execute engine stop in view of safety in one example embodiment.

Further, in a case where a vehicle tows a trailer, braking performance or risk avoiding performance is concerned to be lowered more compared with a case where the vehicle does not tow the trailer. This may be due to an influence of inertial force caused by mass of the trailer itself or behavior disturbance of the trailer during hard braking.

Therefore, a vehicle that executes inertia traveling by stopping an engine during the traveling of the vehicle may be required to secure safety of the vehicle while the vehicle is towing something.

In this regard, in order to more securely execute inertia traveling even in a case where, for example, braking performance is lowered while the vehicle is towing something, it may be thought to set a condition to stop the engine more severely (that is, so that an operational range to stop the engine is to be narrowed). For example, the condition may be set to make greater the minimum inter-vehicle distance within which the engine stop is not allowed.

However, in a case where the vehicle does not tow anything in such a situation, the engine is not stopped in spite of an operational range in which the engine stop (inertia traveling) is normally allowed. This causes the effect of improving fuel consumption not to be obtained sufficiently.

It is desirable to provide a vehicle control apparatus that is able to stop an engine during traveling of a vehicle appropriately in accordance with satisfaction of a predetermined condition regardless of whether the vehicle is towing something.

A vehicle control apparatus according to the example embodiment may be mounted on an automobile such as a passenger automobile, for example. The automobile may use an engine such as a gasoline engine as a power source for traveling, for example.

FIG. 1 is a block diagram schematically illustrating a configuration of a vehicle on which a vehicle control apparatus according to the present example embodiment is mounted.

An engine 10 may be a power source for traveling of the vehicle. A gasoline engine may be used as the engine 10, for example.

A power transmission device 100 may transmit an output of the engine 10 to unillustrated wheels. The power transmission device 100 may include, for example but not limited to, a torque converter 110, a forward-backward switching mechanism 120, a variator 130, and a final reduction gear unit 140.

The torque converter 110 may be a fluid coupling in which an output shaft of the engine 10 is coupled to an input shaft of the torque converter 110. The torque converter 110 may be a starting device that allows the vehicle to start from a state where a vehicle speed is zero.

Although its illustration is omitted, the torque converter 110 may include, for example but not limited to, a pump impeller, a turbine, and a stator. The pump impeller may be coupled to the input shaft of the torque converter 110. The turbine may be coupled to an output shaft of the torque converter 110. The stator may be fixed to a transmission case provided between the pump impeller and the turbine.

The torque converter 110 may further include a lock-up clutch. The lock-up clutch may restrict relative rotation between the pump impeller and the turbine when the vehicle is in a predetermined operational state.

A transmission control unit 300 may control engaging force of the lock-up clutch.

The output shaft of the torque converter 110 may be coupled to the forward-backward switching mechanism 120.

The forward-backward switching mechanism 120 may allow the vehicle to switch between a forward state and a backward state. In the forward state, rotation of the output shaft of the engine 10 may be transmitted as it is. In the backward state, the rotation of the output shaft of the engine 10 may be transmitted after the rotation is reversed.

The forward-backward switching mechanism 120 may include, for example but not limited to, a planetary gear mechanism, a forward clutch, and a backward clutch.

The forward-backward switching mechanism 120 may be coupled to a crank shaft of the engine 10 via the torque converter 110.

The forward-backward switching mechanism 120 may be able to cut off transmission of torque between the torque converter 110 and the variator 130 by cutting the forward clutch when the vehicle travels forward.

The variator 130 may be provided on output side of the forward-backward switching mechanism 120. The variator 130 may be a speed change mechanism configured to vary a rotation of the output shaft of the engine 10.

The variator 130 may include, for example but not limited to, a primary pulley, a secondary pulley, a chain, and an output shaft.

The primary pulley and the secondary pulley may be allowed to rotate around respective two rotation central axes disposed in parallel.

Each of the primary pulley and the secondary pulley may have a fixed sheave and a movable sheave that hold the chain in between.

The chain may wind up between the primary pulley and the secondary pulley. The chain may transmit power between the primary pulley and the secondary pulley.

The chain may include sheaves in which two or more locker pins are held. The locker pins may be coupled to each other by link plates. The chain may have a ring shape and have flexibility.

Each of the primary pulley and the secondary pulley may allow an interval between the fixed sheave and the movable sheave to be varied steplessly in accordance with a control performed by the transmission control unit 300. This makes it possible to vary an effective diameter by which the chain is wound to shift gears.

The final reduction gear unit 140 may reduce the rotation speed of the output shaft of the variator 130, and transmit the reduced rotation to the unillustrated wheels.

The final reduction gear unit 140 may include, for example but not limited to, a differential mechanism. For example, the differential mechanism may transmit driving force to a reduction gear train such as a hypoid gear and to right and left wheels. The differential mechanism may also absorb a rotational speed difference between the right and left wheels due to, for example, turning of the vehicle.

Further, the vehicle may include an engine control unit 200 and the transmission control unit 300.

Each of the engine control unit 200 and the transmission control unit 300 may be configured as an electronic control apparatus. The electronic control apparatus may include, for example but not limited to, an information processor such as a central processing unit (CPU), a storage device such as a random-access memory (RAM), or a read-only memory (ROM), an input-output interface, and a bus via which these devices are coupled to each other, for example.

Each of the engine control unit 200 and the transmission control unit 300 may communicate with each device via an on-vehicle local area network (LAN) such as a controller area network (CAN) communication system or directly, for example. The engine control unit 200 and the transmission control unit 300 may be able to cooperatively control the engine 10 and the power transmission device 100.

[Configuration of Engine Control Unit 200]

The engine control unit 200 may be an engine controller that totally controls the engine 10 and its auxiliaries.

An accelerator pedal sensor 210, a vehicle speed sensor 220, a steering angle sensor 230, an acceleration sensor 240, a brake control unit 250, an environment recognition unit 260, and a towing detector 270 may be coupled to the engine control unit 200.

The engine control unit 200 may constitute a vehicle control apparatus of the technology by working together with these elements.

The accelerator pedal sensor 210 may include a position encoder configured to detect an operation amount (or pressing amount) of an accelerator pedal. A driver of the vehicle may input an accelerator operation via the accelerator pedal.

The engine control unit 200 may set a driver requested torque on the basis of an output of the accelerator pedal sensor 210. The engine control unit 200 may also control a throttle valve, a fuel injection amount, fuel injection time, injection timing, valve timing, a state of a swirl control valve, an EGR rate, a boost pressure, and the like so that an actual output torque of the engine 10 falls in line with the driver requested torque.

The vehicle speed sensor 220 may detect a traveling speed of the vehicle (vehicle speed).

The vehicle speed sensor 220 may be provided in a wheel hub, for example. The vehicle speed sensor 220 may be configured to output a signal (a so-called vehicle speed pulse signal). Voltage of this signal may periodically vary with a frequency that is proportional to a rotational speed of the wheel.

The engine control unit 200 may be able to calculate the vehicle speed on the basis of an output signal of the vehicle speed sensor 220.

The steering angle sensor 230 may be provided in a power steering apparatus of the vehicle. The steering angle sensor 230 may include a rotary encoder. The rotary encoder may detect a steering angle (a rotation angle of a steering shaft=an operation angle of a steering wheel) in a steering apparatus.

The steering angle sensor 230 may be configured to communicate with the engine control unit 200 via an unillustrated power steering apparatus control unit.

The acceleration sensor 240 may include an acceleration pickup configured to detect acceleration acting on a vehicle body in each of a front-back direction and a width direction of the vehicle.

The brake control unit 250 may control a hydraulic control unit. The hydraulic control unit may separately control a fluid pressure of a wheel cylinder of each wheel in a fluid pressure type service brake of the vehicle.

The brake control unit 250 may detect the fluid pressure of each of the wheel cylinders.

The brake control unit 250 may perform an antilock brake control, a vehicle behavior control, and a torque vectoring control, for example. In the antilock brake control, the brake control unit 250 may periodically reduce the pressure of the wheel cylinder to restore the rotation in a case where lock of the wheels occurs. In the vehicle behavior control, when understeer behavior or oversteer behavior occurs, the brake control unit 250 may generate a braking force difference between the right and left wheels to generate a yaw moment in a direction to suppress the behavior. In the torque vectoring control, the brake control unit 250 may improve turning performance by applying braking force to inner wheels while turning of the vehicle.

The environment recognition unit 260 may perform environmental recognition by acquiring information regarding the surrounding environment of an own vehicle. The environment recognition unit 260 may use various kinds of sensors such as a stereo camera, a monocular camera, a millimeter-wave radar device, a laser radar device, or a laser scanner, an own vehicle location positioning apparatus, a navigation apparatus having map data, road-to-vehicle communication, or vehicle-to-vehicle communication, for example.

The environment recognition unit 260 may detect a preceding vehicle that travels in front of the own vehicle on the same traffic lane in the same direction. The environment recognition unit 260 may also detect, for example but not limited to, an inter-vehicle distance from this preceding vehicle to the own vehicle and a relative speed. In one embodiment, the preceding vehicle that travels in front of the own vehicle on the same traffic lane in the same direction may serve as "another vehicle that travels immediately before the own vehicle".

The towing detector 270 detects whether the own vehicle is in a towing state. The towing state may be a state in which the own vehicle tows any other towed vehicle (for example, a trailer).

The towing detector 270 may detect a coupling state of a connector, for example. The connector may be used to supply an electric power, for example, for an operation of lamps and the like from the own vehicle to the towed vehicle. This makes it possible for the towing detector 270 to detect whether the vehicle is in the towing state.

The transmission control unit 300 may totally control the power transmission device 100 and its auxiliaries.

The transmission control unit 300 may control, for example but not limited to, the engaging force of the lock-up clutch in the torque converter 110, a state of the forward-backward switching mechanism 120, a transmission gear ratio in the variator 130, and clamping force of the chain, for example, in accordance with a traveling state of the vehicle.

[Engine Stopping Control During Traveling of Vehicle]

Figure 2:
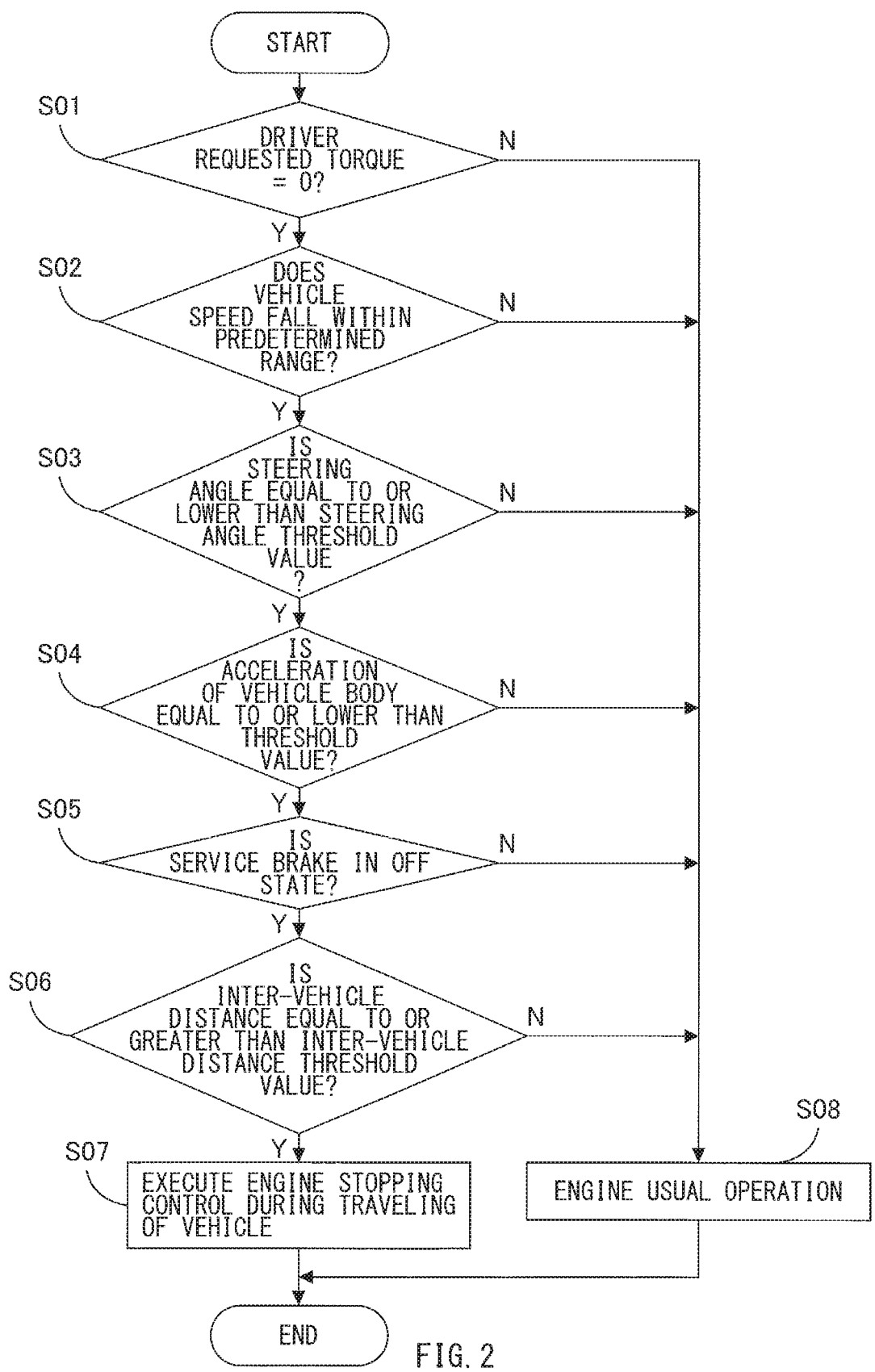
FIG. 2 is a flowchart illustrating an example of an engine stopping control, during traveling of the vehicle, performed by the vehicle control apparatus according to the example embodiment.

FIG. 2 is a flowchart illustrating an engine stopping control during the traveling of the vehicle to be performed by the vehicle control apparatus according to the present example embodiment.

The engine stopping control during the traveling of the vehicle will be described below step by step.

[Step S01: Determination of Driver Requested Torque]

The engine control unit 200 may determine whether driver requested torque is zero. The driver requested torque may be set on the basis of an output of the accelerator pedal sensor 210.

For example, in a case where the accelerator pedal sensor 210 detects that a driver does not depress the accelerator pedal, it may be determined that the driver requested torque is zero.

In a case where the engine control unit 200 determines that the driver requested torque is zero, the process flow may proceed to Step S02. In a case where it is determined that the driver requested torque is not zero, the process flow may proceed to Step S08.

[Step S02: Determination of Vehicle Speed]

The engine control unit 200 may determine whether a current traveling speed (vehicle speed) of the own vehicle, which is calculated on the basis of the output signal of the vehicle speed sensor 220, falls within a predetermined range set in advance. In one example embodiment, the engine control unit 200 may determine whether the current traveling speed of the own vehicle is lower than an upper limit and equal to or higher than a lower limit.

In a case where it is determined that the vehicle speed falls within the predetermined range, the process flow may proceed to Step S03. In a case where it is determined that the vehicle speed does not fall within the predetermined range, the process flow may proceed to Step S08.

[Step S03: Determination of Steering Angle]

The engine control unit 200 may determine whether a current steering angle in the steering apparatus, which is detected by the steering angle sensor 230, is equal to or lower than a steering angle threshold value set in advance. Namely, the engine control unit 200 may determine whether the own vehicle is traveling on a straight road or a gentle curved road on the basis of the current steering angle.

In a case where it is determined that the steering angle is equal to or lower than the steering angle threshold value, the process flow may proceed to Step S04. In a case where it is determined that the steering angle is higher than the steering angle threshold value, the process flow may proceed to Step S08.

[Step S04: Determination of Acceleration of Vehicle Body]

The engine control unit 200 may determine whether the acceleration of the vehicle body in each of the front-back direction and the width direction, which is detected by the acceleration sensor 240, is equal to or lower than a threshold value. This threshold value may be set in advance for the acceleration in each of the front-back direction and the width direction separately.

In a case where it is determined that both of the accelerations in the front-back direction and the width direction are equal to or lower than the corresponding threshold values, the process flow may proceed to Step S05. Otherwise, the process flow may proceed to Step S08.

[Step S05: Determination of Brake State]

The engine control unit 200 may determine whether a state of the service brake is an ON state or an OFF state on the basis of information related to the fluid pressure of the wheel cylinder of each wheel in the service brake of the vehicle. The information may be transmitted from the brake control unit 250. The braking force may be generated in the ON state, and no braking force may be generated in the OFF state.

In a case where it is determined that the state of the service brake is the OFF state, the process flow may proceed to Step S06. In a case where it is determined that the state of the service brake is the ON state, the process flow may proceed to Step S08.

[Step S06: Determination of Inter-vehicle Distance]

The environment recognition unit 260 may determine whether a preceding vehicle is present that travels in front of the own vehicle on the same traffic lane, on the basis of detection results of the various kinds of sensors. Further, in a case where it is determined that the preceding vehicle is present, the environment recognition unit 260 may recognize the inter-vehicle distance from the preceding vehicle to the own vehicle and a relative speed thereof on the basis of the detection results of the various kinds of sensors. The environment recognition unit 260 may transmit recognition results to the engine control unit 200.

In a case where it is determined that the inter-vehicle distance is equal to or greater than a predetermined inter-vehicle distance threshold value and the preceding vehicle does not approach the own vehicle with the relative speed higher than a predetermined speed, the engine control unit 200 may determine that there is low risk for rear-end contact. The process flow may thereafter proceed to Step S07. Otherwise, the process flow may proceed to Step S08.

Setting of the inter-vehicle distance threshold value will be described later in detail.

[Step S07: Execution of Engine Stopping Control During Traveling of Vehicle]

The engine control unit 200 may determine that a predetermined during-traveling engine stopping condition is satisfied. The engine control unit 200 may thereafter execute the engine stopping control during the traveling of the vehicle in which fuel injection and ignition of the engine 10 are suspended during the traveling of the vehicle to stop the engine 10.

It is to be noted that, in a case where it is determined that at least one of the conditions in the respective Steps S01 to S06 is not satisfied, the engine control unit 200 may be configured to automatically restart the engine 10 that has been stopped in this manner. Further, in order to prevent automatic stopping and restart of the engine 10 from being repeated frequently, a condition (such as a threshold value) at the time of automatic stopping of the engine 10 may be different from a condition at the time of restart of the engine 10, thereby providing hysteresis.

In this case, a cooperative control with the transmission control unit 300 may cause the forward clutch of the forward-backward switching mechanism 120 to be released, whereby transmission of the torque to the torque converter 110 may be cut off. This may prevent friction such as a friction loss or a pumping loss of the engine 10 from becoming a load on the engine 10. Therefore, it is possible to extend a distance by which the vehicle is allowed to travel by inertia while stopping the engine 10.

The series of processes may thereafter be ended.

[Step S08: Engine Usual Operation]

In a case where the engine stopping control during the traveling of the vehicle described above is executed, the engine control unit 200 may prohibit its execution, and cause the engine 10 to shift to a usual operational state. Further, in a case where the engine 10 is in the usual operational state, the engine control unit 200 may cause the engine 10 to maintain the usual operational state without any change.

The series of processes may thereafter be ended.

Here, in the present example embodiment, the inter-vehicle distance threshold value in the engine stopping control during the traveling of the vehicle described above (see Step S06) may be made different on the basis of whether the own vehicle is in the towing state as will be described below.

Figure 3:
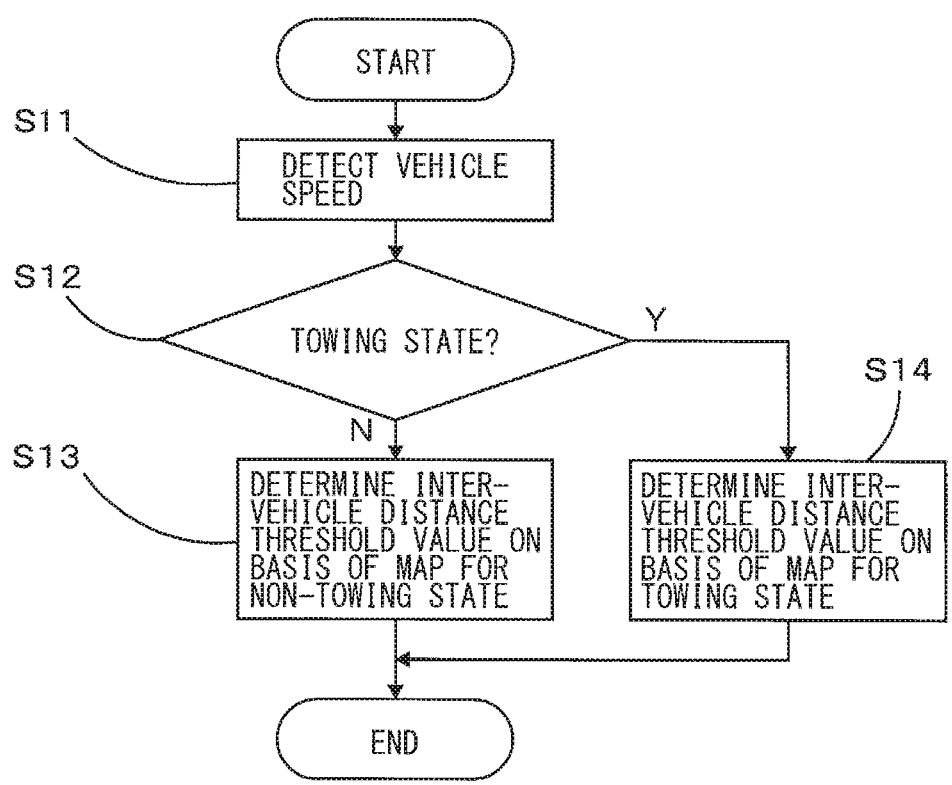
FIG. 3 is a flowchart illustrating an example of an inter-vehicle distance threshold value determining process in an engine stopping control during the traveling of the vehicle, to be performed by the vehicle control apparatus according to the example embodiment.

FIG. 3 is a flowchart illustrating an inter-vehicle distance threshold value determining process in the engine stopping control during the traveling of the vehicle to be performed by the vehicle control apparatus according to the present example embodiment.

The inter-vehicle distance threshold value determining process will be described below step by step.

[Step S11: Detection of Vehicle Speed]

The engine control unit 200 may detect a current vehicle speed of the own vehicle on the basis of the output signal of the vehicle speed sensor 220.

After the vehicle speed is detected, the process flow may proceed to Step S12.

[Step S12: Determination of Towing State]

The towing detector 270 may determine whether the own vehicle is currently in the towing state in which the own vehicle is towing another towed vehicle (for example, a trailer).

In a case where the towing detector 270 determines that the own vehicle is not in the towing state, the process flow may proceed to Step S13. In a case where the towing detector 270 determines that the own vehicle is in the towing state, the process flow may proceed to Step S14.

[Step S13: Determination of Inter-Vehicle Distance Threshold Value Based on Map for Non-Towing State]

The engine control unit 200 may determine the inter-vehicle distance threshold value to be used in Step S06 described above by using a map for a non-towing state prepared in advance.

The map for the non-towing state may include, for example, inter-vehicle distance threshold values corresponding to respective traveling speeds of the own vehicle (vehicle speeds). The engine control unit 200 may be configured to read any of the inter-vehicle distance threshold values in accordance with the corresponding traveling speed of the own vehicle.

The inter-vehicle distance threshold value may be set in view of a reference inter-vehicle distance. Even though any abnormality occurs in a preceding vehicle, the own vehicle may be allowed to stop securely by the reference inter-vehicle distance without coming into contact with the preceding vehicle.

Further, the inter-vehicle distance threshold value may be set to be increased in accordance with an increase in the vehicle speed of the own vehicle. In other words, the inter-vehicle distance threshold value may be so set that the inter-vehicle distance is increased in accordance with the increase in the vehicle speed of the own vehicle. Namely, the engine control unit 200 may increase or decrease the inter-vehicle distance threshold value on the map for the non-towing state in accordance with the current vehicle speed of the own vehicle determined on the basis of an output of the vehicle speed sensor 220.

Such an inter-vehicle distance threshold value may be configured to be adjusted in accordance with a factor such as weather or an estimated friction coefficient of a road. In this case, the engine control unit 200 may adjust the inter-vehicle distance threshold value, for example, by acquiring environmental information from the environment recognition unit 260, or acquiring traffic information provided by the vehicle information and communication system (VICS: registered trademark) or weather information provided via the Internet.

The series of processes may thereafter be ended.

[Step S14: Determination of Inter-Vehicle Distance Threshold Value Based on Map for Towing State]

A map for the towing state may be prepared in advance in addition to the map for the non-towing state. The engine control unit 200 may determine the inter-vehicle distance threshold value to be used in Step S06 described above by using the map for the towing state.

A configuration of the map for the towing state may substantially correspond to a configuration of the map for the non-towing state described above. However, the map for the towing state may be set so that the inter-vehicle distance threshold value of the map for the towing state is relatively greater than the inter-vehicle distance threshold value of the map for the non-towing state for the equivalent vehicle speed.

An increased amount of the inter-vehicle distance threshold value of the map for the towing state from the inter-vehicle distance threshold value of the map for the non-towing state for the equivalent vehicle speed may be set in view of lowering of braking performance of the vehicle and/or risk avoiding performance due to the towing. For example, the engine control unit 200 may determine the increased amount of the inter-vehicle distance threshold value of the map for the towing state on the basis of a superimposed load on the towed vehicle. In a case where the own vehicle tows the towed vehicle, the driver may input the superimposed load on the towed vehicle into the engine control unit 200 via an unillustrated input unit before traveling of the own vehicle.

The series of processes may thereafter be ended.

As explained above, according to the present example embodiment, it is possible to achieve the following example effects.

(1) In a case where the vehicle tows something, the operational range to stop the engine 10 during the traveling of the vehicle may be decreased. This makes it possible to stop the engine 10 securely only in a region in which the engine 10 can be stopped even in a state where braking performance and/or risk avoiding performance is lowered due to the towing. Therefore, it is possible to improve safety of the vehicle while towing something.

In contrast, in a case where the vehicle does not tow something, it is possible to optimize a condition to stop the engine 10 during the traveling of the vehicle to the non-towing state. This makes it possible to enlarge the operational range in which the engine 10 is stopped. Therefore, it is possible to further improve fuel consumption of the vehicle.

(2) In a case where braking performance is lowered due to the towing state, the engine 10 may be stopped during the traveling of the vehicle only when the inter-vehicle distance is greater than that in the usual state. This makes it possible to improve fuel consumption of the vehicle while securing safety of the vehicle.

[Example Effects]

As explained above, according to one embodiment of the technology, it is possible to provide the vehicle control apparatus that allows the engine 10 to be appropriately stopped in accordance with satisfaction of the predetermined condition during the traveling of the vehicle regardless of whether the vehicle is in the towing state.

[Modification Examples]

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

(1) The configuration of the vehicle control apparatus and the configuration of the vehicle on which the vehicle control apparatus is mounted are not limited to that in the example embodiment described above. Such configurations may be modified appropriately.

For example, the engine is not limited to the gasoline engine, and may be a diesel engine or any other internal-combustion engine. Further, the number of cylinders, a cylinder layout, presence or absence of a supercharger, a fuel injection system, and an ignition system are also not limited particularly. Further, the configuration of the power transmission device according to the above-described example embodiment is merely one example. For example, the power transmission device may be configured to include a continuously variable transmission (CVT) other than the chain type, such as a belt type or a toroidal type, or any of a step automatic transmission (AT), an automated manual transmission (AMT), and a dual-clutch transmission (DCT).

(2) The condition to stop the engine during the traveling of the vehicle according to the example embodiment described above is merely one example, and the condition is not limited thereto. For example, any condition other than the condition described above may be added, or a part of the condition may be omitted.

Further, in the example embodiment described above, the engine 10 may be stopped during the traveling of the vehicle only when the driver requested torque is zero, that is, the vehicle is in a state that the accelerator pedal is fully returned. However, the vehicle control apparatus may be configured so that the engine 10 is stopped during the traveling of the vehicle in a case where acceleration of the vehicle is decreased even in a state where the accelerator pedal is somewhat depressed.

(3) In the example embodiment described above, in a case where the towing state of the vehicle is detected, the inter-vehicle distance threshold value at the time when the engine 10 is stopped during the traveling of the vehicle is set to be made greater. However, the technology is not limited to such setting. For example, other conditions or threshold values may be varied in accordance with whether the towing state is detected.

Further, in the engine stopping control during the traveling of the vehicle according to the example embodiment described above, for example, in a case where the towing state is detected, the threshold values of the acceleration of the vehicle body, the steering angle threshold value, or the predetermined range regarding the vehicle speed may be varied.

(4) A specific configuration of the towing detector and the method of detecting the towing state are not limited to those in the example embodiment described above, and may be modified appropriately. For example, in the above-described example embodiment, the towing state may be detected in accordance with the coupling state of the connector used to supply the electric power to the towed vehicle. However, the method of detecting the towing state is not limited thereto. For example, the vehicle control apparatus may be configured to detect the towing state on the basis of correlation between estimated driving force of the vehicle and the acceleration of the vehicle. The estimated driving force may be calculated from, for example, estimated torque of the engine 10 and a reduction ratio.

Each of the engine control unit 200, brake control unit 250, and the transmission control unit 300 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the engine control unit 200, brake control unit 250, and the transmission control unit 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the engine control unit 200, brake control unit 250, and the transmission control unit 300 illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus configured to control a vehicle, the vehicle including an engine that is configured to drive wheels via a power transmission device, the vehicle control apparatus comprising:
   a towing state detector configured to detect whether the vehicle is in a towing state; and
   an engine controller configured to stop the engine in a case where a predetermined engine stopping condition is satisfied during traveling of the vehicle, wherein
   the engine controller is configured to vary, in a case where the towing state detector detects that the vehicle is in the towing state, the predetermined engine stopping condition to reduce an operational range in which the engine is to be stopped compared with an operational range in a case where the towing state detector does not detect that the vehicle is in the towing state.

2. The vehicle control apparatus according to claim 1, further comprising an inter-vehicle distance detector configured to detect an inter-vehicle distance from the vehicle to another vehicle that travels immediately before the vehicle, wherein
   the predetermined engine stopping condition is satisfied in a case where the inter-vehicle distance detected by the inter-vehicle distance detector is equal or greater than an inter-vehicle distance threshold value, and
   the engine controller is configured to increase, in a case where the towing state detector detects that the vehicle is in the towing state, the inter-vehicle distance threshold value compared with an inter-vehicle distance threshold value in a case where the towing state detector does not detect that the vehicle is in the towing state to reduce the operational range in which the engine is to be stopped.

3. The vehicle control apparatus according to claim 2, further comprising a vehicle speed detector configured to detect a traveling speed of the vehicle, wherein
   the inter-vehicle distance threshold value is set to be increased or decreased on a basis of the traveling speed detected by the vehicle speed detector.

4. A vehicle control apparatus configured to control a vehicle, the vehicle including an engine that is configured to drive wheels via a power transmission device, the vehicle control apparatus comprising circuitry configured to:
   control the engine,
   detect whether the vehicle is in a towing state;

stop the engine in a case where a predetermined engine stopping condition is satisfied during traveling of the vehicle; and vary, in a case where the vehicle is detected as being in the towing state, the predetermined engine stopping condition to reduce an operational range in which the engine is to be stopped compared with an operational range in a case where the vehicle is not detected as being in the towing state.

5. A vehicle control apparatus configured to control a vehicle, the vehicle including an engine that is configured to drive wheels via a power transmission device, the vehicle control apparatus comprising a processor programmed to:

set an engine stopping condition, which is one of engine stopping conditions, based on whether the vehicle is towing an object;

when at least one of the engine stopping conditions is not met, control the engine to drive the wheels; and when all the engine stopping conditions are met, control the engine to stop while the vehicle is running, wherein the engine stopping condition to be set is an inter-vehicle distance from the vehicle to another vehicle ahead the vehicle, and wherein when the vehicle is towing the object, the processor is programmed to set the inter-vehicle distance to be longer than that to be set when the vehicle is not towing the object.

6. The vehicle control apparatus according claim 5, wherein the processor is further programmed to adjust the inter-vehicle distance based on a traveling speed of the vehicle that is towing the object when it is determined that the vehicle is towing the object or a traveling speed of the vehicle that is not towing the object when it is determined that the vehicle is not towing the object.

* * * * *